(12) United States Patent
Schoen et al.

(10) Patent No.: US 8,499,040 B2
(45) Date of Patent: Jul. 30, 2013

(54) SPONSORED-STORIES-UNIT CREATION FROM ORGANIC ACTIVITY STREAM

(75) Inventors: Kent Schoen, San Francisco, CA (US); Ning Li, Newark, CA (US); Robert Kang Xing Jin, San Francisco, CA (US); Philip Anastasios Zigoris, San Francisco, CA (US); Jessica Gronski, Menlo Park, CA (US); Jordan Walke, Cupertino, CA (US); Eric Michel Giovanola, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/488,275

(22) Filed: Jun. 4, 2012

(65) Prior Publication Data

US 2012/0239750 A1    Sep. 20, 2012

Related U.S. Application Data

(63) Continuation of application No. 13/020,745, filed on Feb. 3, 2011, now abandoned, and a continuation-in-part of application No. 12/193,702, filed on Aug. 18, 2008.

(60) Provisional application No. 60/985,631, filed on Nov. 5, 2007.

(51) Int. Cl.
    *G06F 15/16* (2006.01)
(52) U.S. Cl.
    USPC ............... 709/204; 709/203; 715/753
(58) Field of Classification Search
    USPC . 709/204, 203; 455/3.01, 66.1, 518; 715/753; 705/7.14, 14.4, 14.5
    See application file for complete search history.

(56) References Cited

U.S. PATENT DOCUMENTS

| 5,987,440 | A  | 11/1999 | O'Neil et al. |
| 6,134,532 | A  | 10/2000 | Lazarus et al. |
| 6,691,155 | B2 | 2/2004 | Gottfried |
| 7,752,552 | B2 | 7/2010 | Pennington et al. |
| 7,844,604 | B2 | 11/2010 | Baio et al. |
| 7,853,622 | B1 | 12/2010 | Baluja et al. |
| 2002/0029186 | A1 | 3/2002 | Roth et al. |
| 2002/0070961 | A1 | 6/2002 | Xu et al. |
| 2002/0087352 | A1 | 7/2002 | Armstrong et al. |
| 2002/0161838 | A1 | 10/2002 | Pickover et al. |
| 2002/0184088 | A1 | 12/2002 | Rosenberg |
| 2003/0046161 | A1 | 3/2003 | Kamangar et al. |

(Continued)

FOREIGN PATENT DOCUMENTS

| JP | 2007-206876 | 8/2007 |
| JP | 2007-241558 | 9/2007 |
| JP | 2007-241894 | 9/2007 |
| WO | WO 98/09447 | 3/1998 |

OTHER PUBLICATIONS

U.S. Appl. No. 13/044,506, filed Mar. 9, 2011, Fougner.
U.S. Appl. No. 12/968,786, filed Dec. 15, 2010, Zhang.

(Continued)

*Primary Examiner* — Frantz Jean
(74) *Attorney, Agent, or Firm* — Fenwick & West LLP

(57) ABSTRACT

In one embodiment, a method includes receiving sponsor specifications designating story characteristics; monitoring an organic activity stream for entries matching the story characteristics; and, in response to identifying an entry as matching the story characteristics, providing for display the entry in a predetermined area of a web page.

26 Claims, 9 Drawing Sheets

U.S. PATENT DOCUMENTS

| | | |
|---|---|---|
| 2003/0137531 A1 | 7/2003 | Katinsky et al. |
| 2003/0163372 A1 | 8/2003 | Kolsy |
| 2003/0187739 A1 | 10/2003 | Powers |
| 2004/0015397 A1 | 1/2004 | Barry et al. |
| 2004/0193691 A1 | 9/2004 | Chang |
| 2004/0210565 A1 | 10/2004 | Lu et al. |
| 2005/0065806 A1 | 3/2005 | Harik |
| 2005/0096980 A1 | 5/2005 | Koningstein |
| 2005/0097204 A1 | 5/2005 | Horowitz et al. |
| 2005/0131992 A1 | 6/2005 | Goldstein et al. |
| 2005/0137958 A1 | 6/2005 | Huber et al. |
| 2005/0144065 A1 | 6/2005 | Calabria et al. |
| 2005/0149397 A1 | 7/2005 | Morgenstern et al. |
| 2005/0171955 A1 | 8/2005 | Hull et al. |
| 2005/0216300 A1 | 9/2005 | Appelman et al. |
| 2005/0246651 A1 | 11/2005 | Krzanowski |
| 2005/0289131 A1 | 12/2005 | Aenlle et al. |
| 2006/0042483 A1 | 3/2006 | Work et al. |
| 2006/0059147 A1 | 3/2006 | Weiss et al. |
| 2006/0064346 A1 | 3/2006 | Steenstra et al. |
| 2006/0085408 A1 | 4/2006 | Morsa |
| 2006/0101341 A1 | 5/2006 | Kelly et al. |
| 2006/0271953 A1 | 11/2006 | Jacoby et al. |
| 2007/0016553 A1 | 1/2007 | Dumais et al. |
| 2007/0043766 A1 | 2/2007 | Nicholas et al. |
| 2007/0073581 A1 | 3/2007 | Kempe et al. |
| 2007/0121843 A1 | 5/2007 | Atazky et al. |
| 2007/0150537 A1 | 6/2007 | Graham |
| 2007/0150603 A1 | 6/2007 | Crull et al. |
| 2007/0157108 A1 | 7/2007 | Bishop |
| 2007/0179792 A1 | 8/2007 | Kramer |
| 2007/0245399 A1 | 10/2007 | Espelien |
| 2007/0260520 A1 | 11/2007 | Jha et al. |
| 2007/0265090 A1 | 11/2007 | Barsness et al. |
| 2007/0299857 A1 | 12/2007 | Gworzdz et al. |
| 2007/0300064 A1 | 12/2007 | Isaacs et al. |
| 2008/0004959 A1 | 1/2008 | Tunguz-Zawislak et al. |
| 2008/0059308 A1 | 3/2008 | Gerken |
| 2008/0065486 A1 | 3/2008 | Vincent et al. |
| 2008/0070209 A1 | 3/2008 | Zhuang et al. |
| 2008/0103913 A1 | 5/2008 | Leach et al. |
| 2008/0104225 A1 | 5/2008 | Zhang et al. |
| 2008/0126476 A1 | 5/2008 | Nicholas et al. |
| 2008/0126949 A1 | 5/2008 | Sharma |
| 2008/0133364 A1 | 6/2008 | Ullah |
| 2008/0133756 A1 | 6/2008 | Taylor |
| 2008/0147498 A1 | 6/2008 | Chao et al. |
| 2008/0147659 A1 | 6/2008 | Chen et al. |
| 2008/0162260 A1 | 7/2008 | Rohan et al. |
| 2008/0177708 A1 | 7/2008 | Ayyar et al. |
| 2008/0189169 A1 | 8/2008 | Turpin et al. |
| 2008/0195428 A1 | 8/2008 | O'Sullivan |
| 2008/0228537 A1 | 9/2008 | Monfried et al. |
| 2008/0270615 A1 | 10/2008 | Centola et al. |
| 2008/0275899 A1 | 11/2008 | Baluja et al. |
| 2008/0276183 A1 | 11/2008 | Siegrist et al. |
| 2008/0281622 A1 | 11/2008 | Hoal |
| 2008/0294624 A1 | 11/2008 | Kanigsberg et al. |
| 2009/0006206 A1 | 1/2009 | Groe et al. |
| 2009/0006469 A1 | 1/2009 | Jain et al. |
| 2009/0018915 A1 | 1/2009 | Fisse |
| 2009/0037257 A1 | 2/2009 | Stuckey et al. |
| 2009/0043648 A1 | 2/2009 | Mahdian et al. |
| 2009/0055257 A1 | 2/2009 | Chien et al. |
| 2009/0055263 A1 | 2/2009 | Okubo et al. |
| 2009/0063467 A1 | 3/2009 | Abhyanker |
| 2009/0070219 A1 | 3/2009 | D'Angelo et al. |
| 2009/0070684 A1 | 3/2009 | Aldrich et al. |
| 2009/0083134 A1 | 3/2009 | Burckart et al. |
| 2009/0099909 A1 | 4/2009 | Phan |
| 2009/0106040 A1 | 4/2009 | Jones |
| 2009/0106113 A1 | 4/2009 | Arora et al. |
| 2009/0106447 A1 | 4/2009 | Lection |
| 2009/0112701 A1 | 4/2009 | Turpin et al. |
| 2009/0113480 A1 | 4/2009 | Allard et al. |
| 2009/0119167 A1 | 5/2009 | Kendall et al. |
| 2009/0171748 A1 | 7/2009 | Aven et al. |
| 2009/0182589 A1 | 7/2009 | Kendall et al. |
| 2009/0271247 A1 | 10/2009 | Karelin et al. |
| 2009/0292656 A1 | 11/2009 | Raman et al. |
| 2010/0010822 A1 | 1/2010 | Bal et al. |
| 2010/0023871 A1 | 1/2010 | Bederson et al. |
| 2010/0057536 A1 | 3/2010 | Stefik et al. |
| 2010/0063892 A1 | 3/2010 | Keronen et al. |
| 2010/0070335 A1 | 3/2010 | Parekh et al. |
| 2010/0174593 A1 | 7/2010 | Cao et al. |
| 2010/0217645 A1 | 8/2010 | Jin et al. |
| 2010/0223119 A1 | 9/2010 | Klish |
| 2010/0228582 A1 | 9/2010 | King et al. |
| 2010/0228617 A1 | 9/2010 | Ransom et al. |
| 2010/0293054 A1 | 11/2010 | Lieberman |
| 2010/0293221 A1 | 11/2010 | Sidman et al. |
| 2011/0029388 A1 | 2/2011 | Kendall et al. |
| 2011/0040586 A1 | 2/2011 | Murray et al. |
| 2011/0040629 A1 | 2/2011 | Chiu et al. |
| 2011/0041168 A1 | 2/2011 | Murray et al. |
| 2011/0078228 A1 | 3/2011 | Bristol et al. |
| 2011/0093336 A1 | 4/2011 | Calabria |
| 2011/0154203 A1 | 6/2011 | Spencer et al. |
| 2011/0161419 A1 | 6/2011 | Chunilal |
| 2011/0208582 A1 | 8/2011 | Hoyle |
| 2011/0320274 A1 | 12/2011 | Patil |
| 2012/0095836 A1 | 4/2012 | Kendall et al. |
| 2012/0101898 A1 | 4/2012 | Kendall et al. |
| 2012/0109757 A1 | 5/2012 | Kendall et al. |
| 2012/0203847 A1 | 8/2012 | Kendall et al. |
| 2012/0204096 A1 | 8/2012 | Kendall et al. |
| 2012/0208512 A1* | 8/2012 | Maharajh et al. .......... 455/414.1 |
| 2012/0246232 A1 | 9/2012 | Schoen et al. |
| 2013/0024250 A1 | 1/2013 | Wu et al. |

OTHER PUBLICATIONS

U.S. Appl. No. 12/884,010, filed Sep. 16, 2010, Kao.

Anonymous, "HTTP cookie," Wikipedia, the free encyclopedia, Oct. 2007, XP002680841, sixteen pages. [Online] [Retrieved Jul. 26, 2012] Retrieved from the Internet <URL:http://en.wikipedia.org/w/index.php?title=HTTP_cookie&oldid=168063574.>.

Australian Government, IP Australia, Examiner's First Report, Australian Patent Application No. 2008-324952, May 21, 2012, two pages.

Canadian Intellectual Property Office, Office Action, Canadian Patent Application No. 2,704,680, Jul. 25, 2012, two pages.

Canadian Intellectual Property Office, Office Action, Canadian Patent Application No. 2,703,851, Aug. 6, 2012, three pages.

European Patent Office, Supplementary European Search Report and Opinion, European Patent Application No. 08847154.5, Sep. 3, 2012, eight pages.

PCT International Preliminary Report on Patentability, PCT Application No. PCT/US2008/080790, May 20, 2010, five pages.

PCT International Search Report and Written Opinion, PCT Application No. PCT/US2008/080790, Dec. 19, 2008, nine pages.

PCT International Search Report and Written Opinion, PCT Application No. PCT/US2008/080789, Dec. 12, 2008, seven pages.

PCT International Search Report and Written Opinion, PCT Application No. PCT/US2011/061545, Mar. 27, 2012, six pages.

State Intellectual Property Office of the People's Republic of China, First Office Action, Chinese Patent Application No. 2008-80114546.2, Oct. 14, 2011, eight pages.

State Intellectual Property Office of the People's Republic of China, Rejection Decision, Chinese Patent Application No. 2008-80114546.2, Jun. 20, 2012, nine pages.

U.S. Office Action, U.S. Appl. No. 12/193,702, Aug. 18, 2010, forty-nine pages.

U.S. Office Action, U.S. Appl. No. 12/193,702, Dec. 22, 2010, forty-eight pages.

U.S. Office Action, U.S. Appl. No. 12/193,702, Jan. 23, 2012, forty pages.

U.S. Office Action, U.S. Appl. No. 12/193,702, Jul. 25, 2011, forty-two pages.

U.S. Office Action, U.S. Appl. No. 12/853,241, May 22, 2012, thirty-one pages.

U.S. Office Action, U.S. Appl. No. 12/968,786, Dec. 21, 2012, eleven pages.

U.S. Office Action, U.S. Appl. No. 13/338,190, Mar. 27, 2012, fifty-two pages.
U.S. Office Action, U.S. Appl. No. 13/338,190, Sep. 6, 2012, eighty-four pages.
U.S. Office Action, U.S. Appl. No. 13/342,003, Dec. 12, 2012, thirty-four pages.
U.S. Office Action, U.S. Appl. No. 13/342,006, May 8, 2012, sixty-three pages.
U.S. Office Action, U.S. Appl. No. 13/447,100, Jul. 27, 2012, thirty-three pages.
U.S. Office Action, U.S. Appl. No. 13/447,100, Nov. 14, 2012, thirty-five pages.
U.S. Office Action, U.S. Appl. No. 13/447,102, Jun. 1, 2012, sixty-two pages.
U.S. Office Action, U.S. Appl. No. 13/447,102, Nov. 29, 2012, sixty pages.
U.S. Office Action, U.S. Appl. No. 13/619,894, Jan. 7, 2013, seven pages.
U.S. Appl. No. 13/804,150, filed Mar. 14, 2013, Inventors Timothy Kendall et al.
U.S. Office Action, U.S. Appl. No. 13/342,003, Apr. 5, 2013, fifty-six pages.
U.S. Office Action, U.S. Appl. No. 12/853,241, Apr. 22, 2013, thirty-nine pages.
U.S. Office Action, U.S. Appl. No. 13/447,100, Apr. 24, 2013, twenty-five pages.
Patent Cooperation Treaty, International Search Report and Written Opinion, International Patent Application No. PCT/US2012/023631, Sep. 10, 2012, 8 Pages.
United States Patent and Trademark Office, Non-Final Rejection, U.S. Appl. No. 13/488,596, Sep. 18, 2012, 11 pages.
U.S. Appl. No. 13/448,596, filed Jun. 5, 2012.
U.S. Appl. No. 13/619,894, filed Sep. 14, 2012.

* cited by examiner

SPONSORED-STORIES-UNIT CREATION FROM ORGANIC ACTIVITY STREAM

RELATED APPLICATION(S)

This application is a continuation under 35 U.S.C. §120 of U.S. patent application Ser. No. 13/020,745, filed 3 Feb. 2011. This application is also a continuation-in-part of application Ser. No. 12/193,702, filed Aug. 18, 2008, which claims priority to the U.S. Provisional Application Ser. No. 60/985,631, filed Nov. 5, 2007. The contents of these applications are incorporated herein by reference.

TECHNICAL FIELD

This disclosure relates generally to social-networking websites and other systems in which users can form connections with other users.

This disclosure hereby incorporates by reference commonly-owned U.S. patent application Ser. No. 12/968,786, entitled "Targeting Social Advertising to Friends of Users Who Have Interacted with an Object Associated with the Advertising," filed 15 Dec. 2010.

This disclosure hereby incorporates by reference commonly-owned U.S. patent application Ser. No. 12/88,4010, entitled "Action Clustering for News Feeds," filed 16 Sep. 2010.

BACKGROUND

Social networks, or social utilities that track and enable connections between users (including people, businesses, and other entities), have become prevalent in recent years. In particular, social-networking websites allow users to communicate information more efficiently. For example, a user may post contact information, background information, job information, hobbies, or other user-specific data to a location associated with the user on a social-networking website. Other users can then review the posted data by browsing user profiles or searching for profiles including specific data. Social-networking websites also allow users to associate themselves with other users, thus creating a web of connections among the users of social-networking website. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target sponsored stories that are of interest to the user. Using information collected from and about users results in a system that is more efficient and beneficial for both the user and the system.

Users interacting with the social network may post stories or status updates to a live activity stream, such as a "news feed." A news feed is a data format typically used for providing users with frequently updated content. A social-networking system may provide various news feeds to its users, where each news feed includes content relating to a specific subject matter or topic, or other users. Various pieces of content may be aggregated into a single news feed. In some implementations, a social-networking system may provide a news feed that includes selected entries corresponding to activities of a user's first-degree contacts or pages or topics that a user has indicated an interest for. Individual users of the social-networking system may subscribe to specific news feeds of their interest. A group of related actions may be presented together to a user of the social-networking system in the same news feed. For example, a news feed concerning the event organized through the social-networking system may include information about the event, such as its time, location, and attendees, and photos taken at the event, which have been uploaded to the social-networking system.

Generally, news feeds are customized for each member; only the status updates and stories posted by their connections are displayed. In this manner, members of the social network may quickly access their direct connections' status updates, story postings, and other interactions with the social network in a single stream, obviating the need to individually check their connections' profile pages.

However, given the vast number of contacts the average member of a social network has, and the prodigious amounts of status updates posted by users, it is possible that stories of interest to the user are lost in the unending stream of their news feed. Furthermore, sponsors may wish to pay for permanence of a particular story in members' news feeds; this functionality is unavailable in typical social-networking systems.

Typically sponsors pay for a static advertisement to be displayed to a member of the social network. In particular embodiments, advertisements may be displayed to a member's home page on the social network, mobile devices, third-party web pages and applications, television and other video streams, or any other particular display accessed by a member of the social network. Despite data-mining techniques that match users based on their preferences, activities, or other data stored in their social-networking profile to the most relevant sponsored or promoted stories, no system currently exists for promoting a story from a user's news feed to the sponsored-stories space of a social-network home page. Sponsored or promoted stories generated from actual stories in users' news feeds are more likely to be viewed by users, because they generally involve interactions or suggestions by their connected friends or fan pages that they are connected or subscribed to.

DESCRIPTION OF EXAMPLE EMBODIMENT(S)

Particular embodiments relate to a social-networking environment including a social-networking system and related systems that integrate individual stories, status updates, and user interactions with an advertising system. A social-networking system offers its users the ability to communicate and interact with other users of the social-networking system. Users join the social-networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to.

Implementations of this disclosure extend these concepts by allowing sponsors or specific users to export by promoting specific news feed stories to sponsored-story space on users' social-networking pages, thereby increasing the permanence and viewing frequency of these stories. In one example, a user may want to promote one of his news stories so that more of his connected friends can see the story in a more frequent and permanent view. For example, a sponsor who publishes an application, such as a social-networking game, may wish for status updates generated with its application to have permanence on the application user's friends' homepages. In another example, a sponsor associated with a page on the social network, may want to promote news stories when a user connects to the page on the social network or to an object associated with the sponsor off network. In another example, the proprietor of a store may wish to promote news stories to a user's friends when that user "checks-in", or indicates that he physically visited, the store. In another example, the proprietor of a store may wish to promote news stories to a user's friends when that user subscribes, purchase, or redeems a deal or coupon associated with the sponsor. Other embodiments are readily envisioned by the disclosure and are described in detail below.

Figure 1:
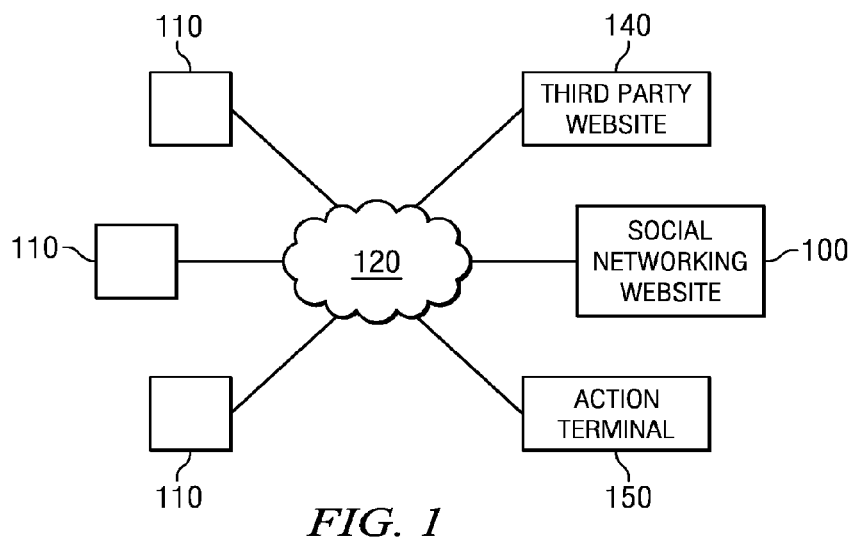
FIG. 1 illustrates an social-networking system website.

FIG. 1 illustrates an example social-networking website 100. The system environment comprises one or more client devices 110, one or more third-party websites 140, a social-networking website 100, and a network 120. In alternative configurations, different or additional modules can be included in the system.

Client devices 110 comprise one or more computing devices that can receive member input and can transmit and receive data via network 120. For example, client devices 110 may be desktop computers, laptop computers, smart phones, personal digital assistants (PDAs), or any other device including computing functionality and data communication capabilities. Client devices 120 are configured to communicate via network 120, which may comprise any combination of local area or wide area networks, using both wired and wireless communication systems. Third party website 140 and action terminal 150 are coupled to network 120 for communicating messages to social-networking website 100 about the members' actions off website 100.

Social-networking website 100 comprises a computing system that allows members to communicate or otherwise interact with each other and access content as described herein. Social-networking website 100 stores member profiles that describe the members of a social network, including biographic, demographic, and other types of descriptive information, such as work experience, educational history, hobbies or preferences, location, and the like. Website 100 further stores data describing one or more relationships between different members. The relationship information may indicate members who have similar or common work experience, group memberships, hobbies, or educational history. Additionally, social-network host site 120 includes member-defined relationships between different members, allowing members to specify their relationships with other members. For example, these member-defined relationships allow members to generate relationships with other members that parallel the members' real-life relationships, such as friends, co-workers, partners, and so forth. Members may select from predefined types of relationships, or define their own relationship types as needed.

Figure 2:
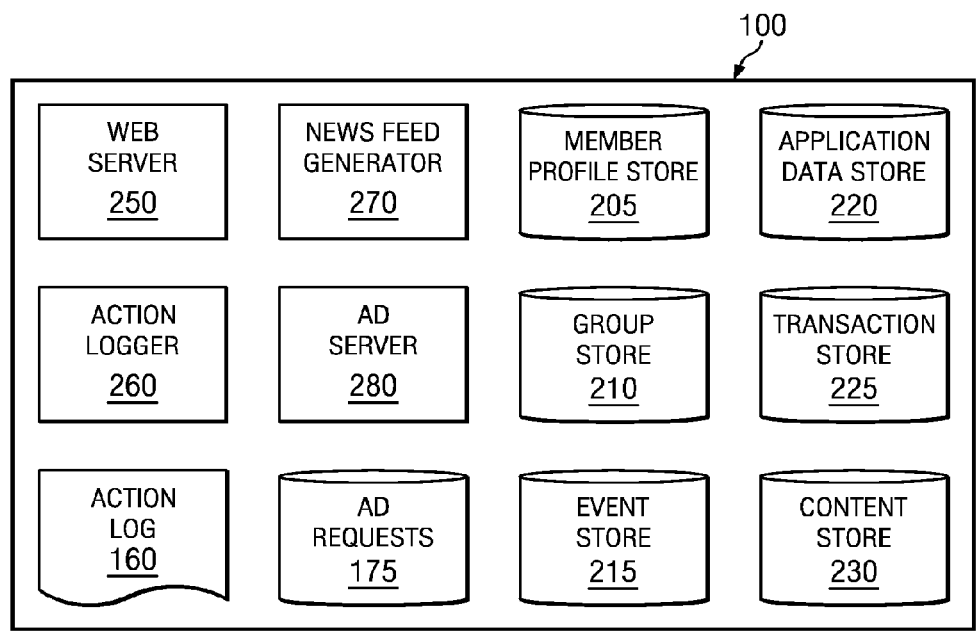
FIG. 2 illustrates example hardware components of an example social-networking system.

FIG. 2 illustrates example hardware components of social-networking website 100. Social-networking website 100 includes a web server 250, an action logger 260, an action log 160, a news feed generator 270, an ad server 280, a database of ad requests 175, a member profile store 205, a group store 210, an event store 215, an application data store 220, a transaction store 225, and a content store 230. In other embodiments, social-networking website 100 may include additional, fewer, or different modules for various applications.

Web server 250 links social-networking website 100 via network 220 to one or more client devices 110, as well as to one or more third party websites 140. Web server 250 may include a mail server or other messaging functionality for receiving and routing messages between social-networking website 100 and client devices 110 or third party websites 140. The messages can be instant messages, queued messages (e.g. e-mail), text and SMS messages, or any other suitable messaging technique.

Action logger 260 is capable of receiving communications from the web server 250 about member actions on or off social-networking website 100. News feed generator 270 generates communications for each member about information that may be relevant to the member. These communications may take the form of stories; with each story being an information message comprising one or a few lines of information about an action in action log 160 that is relevant to the particular member. The stories are presented to a member via one or more pages of the social-networking website 100, for example in each member's home page or news feed page.

Ad server 280 executes one or more ad-selection algorithms. Ad server 280 is communicatively coupled to the database of ad requests 175 and to action log 160 for this purpose.

Figure 3:
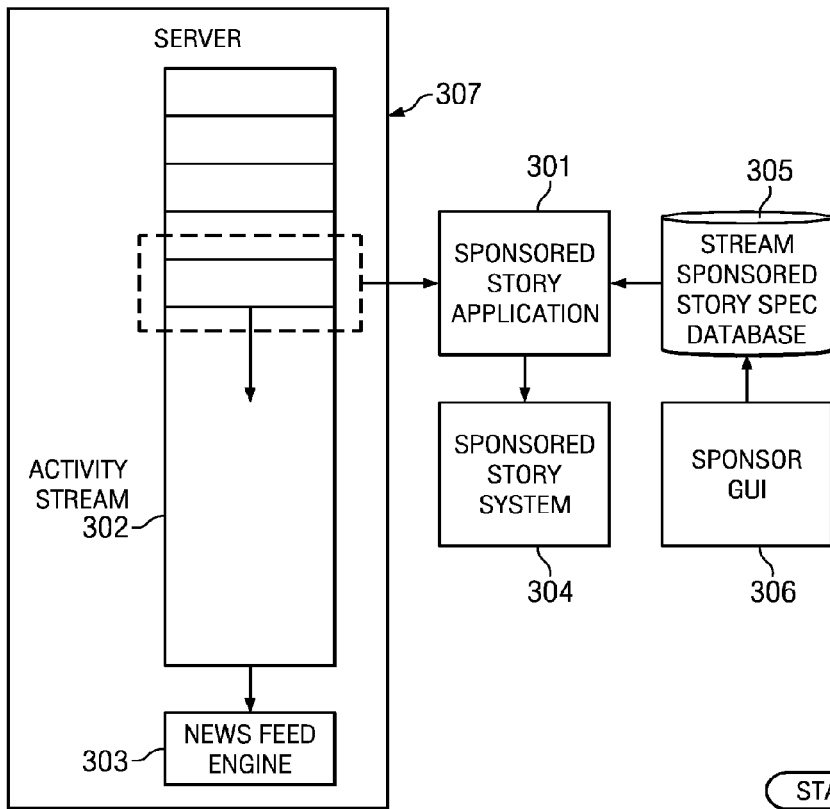
FIG. 3 illustrates example interaction between an example organic activity stream and an example sponsored-story-specification database to create sponsored stories from news-feed stories in particular embodiments.

FIG. 3 illustrates example interaction between sponsored-story application 301 and an activity stream 302 in particular embodiments. In particular embodiments, sponsored-story application 301 may be software residing within the sponsored-story system 304 or part of stream-sponsored-story-specification database 305. In particular embodiments, sponsored-story application 301 may be software executed by any number of servers in the social-networking system, either in conjunction or in isolation. In particular embodiments, sponsored-story application 301 may reside on its own dedicated hardware. Activity stream 302 comprises the aggregate stream of status updates and news stories for all users of a social network. Activity stream 302 under normal operation passes to news feed engine 303, which parses the individual stories in activity stream 302 and determines which users' (generally the friends of the user who generated the story) pages to display each story on. In particular embodiments, both activity stream 302 and news feed engine 303 are applications residing in server 307. In particular embodiments, activity stream 302 or news feed engine 303 are applications distributed across one or more computing servers. This disclosure contemplates any suitable implementation of activity stream 302 and news feed engine 303.

Figure 6A:
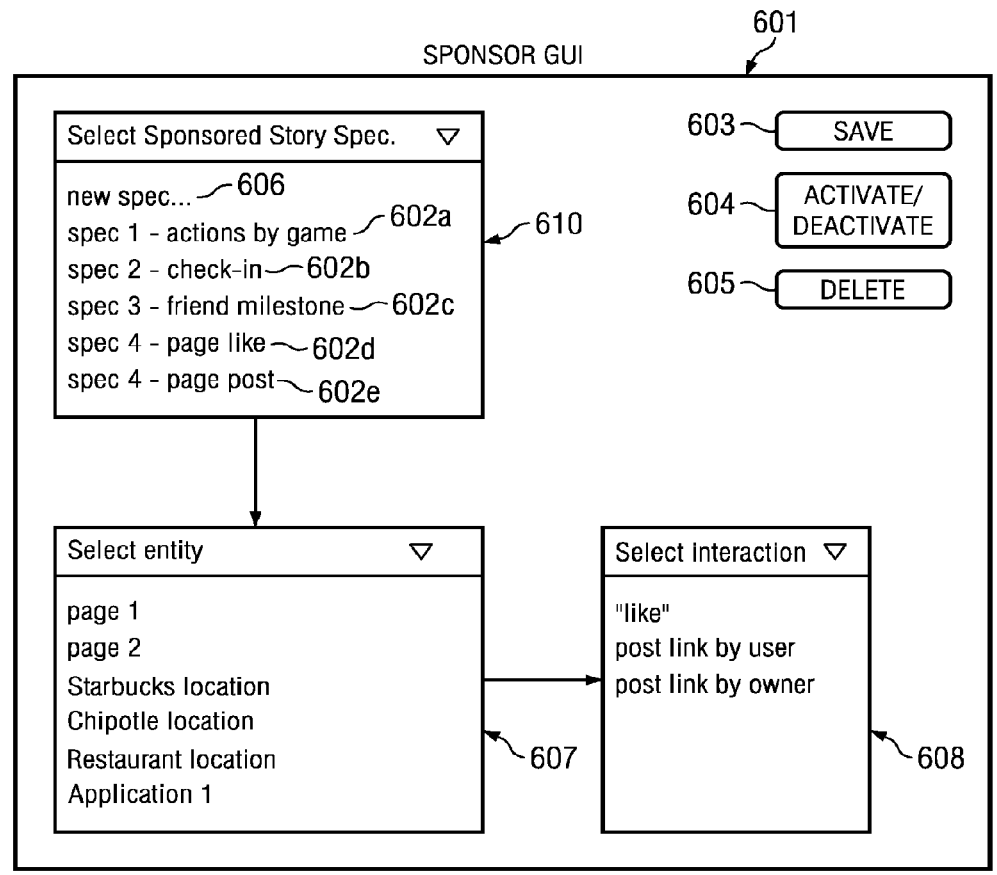
FIG. 6A illustrates an example sponsor GUI used by sponsors to specify types of stories they want to sponsor or promote to the sponsored-story system in particular embodiments.
Figure 6B:
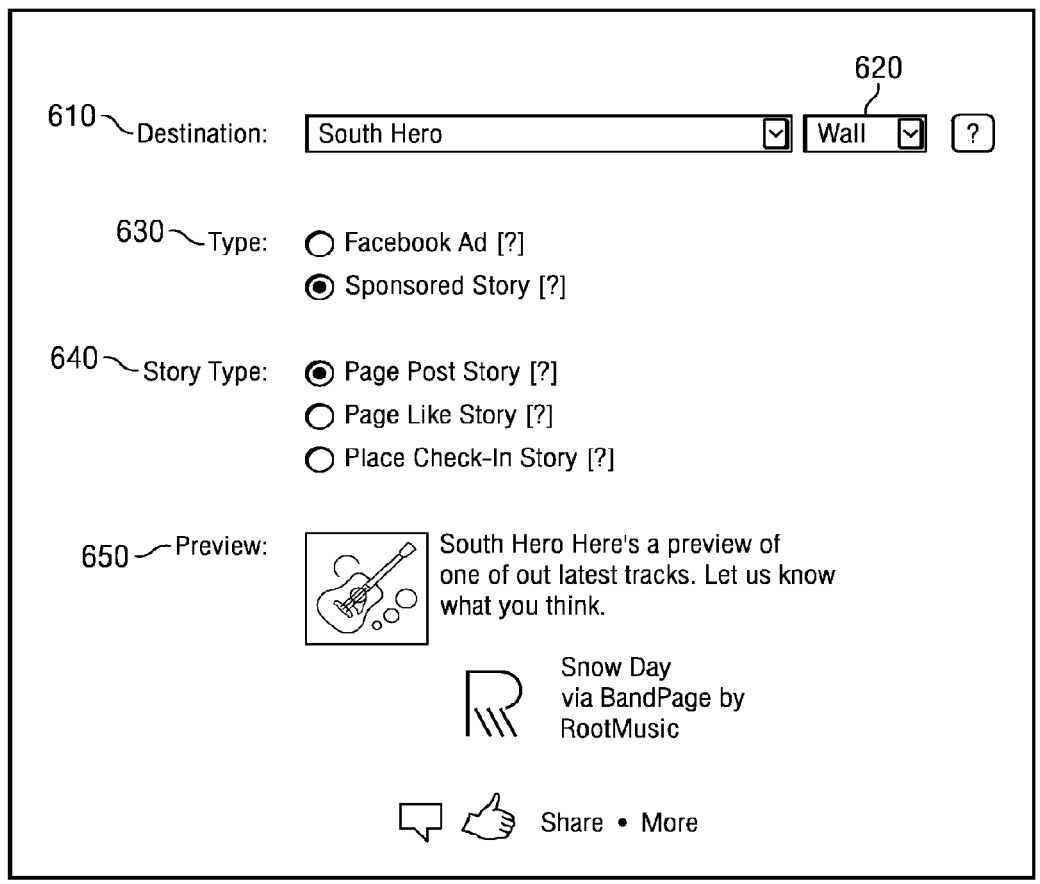
FIG. 6B illustrates an example simplified sponsor GUI.

A sponsor uses sponsor GUI 306 to specify the type of stories it wants promoted to the sponsored-story section of users' pages. Examples of Sponsor GUI 306 are depicted in FIGS. 6A and 6B. Sponsor GUI 306 provides a method for the sponsor to create story filters to locate specific types of news feed stories for promoting to the sponsored-story space of a user's home page. Once the sponsor sets up its preferences for the types of stories it wishes to promote to the sponsored-story portion, the sponsor specifications are stored into stream sponsored-story specification database 305.

Figure 4:
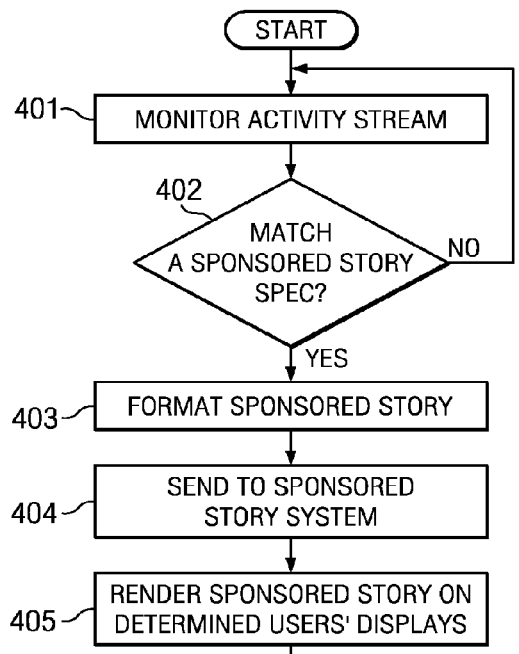
FIG. 4 illustrates an example method for promoting a stream sponsored story to a sponsored-story space.

FIG. 4 illustrates an example method for the sponsored-story system. In step 401, sponsored-story application 301 constantly monitors activity stream 302, searching for matches to any of the sponsored-story specifications in stream-sponsored-story-specification database 305. In step 402, the sponsored-story system compares each story in the activity stream 302 to all stream-sponsored-story specifications in stream-sponsored-story-specification database 305. If there is a match, the procedure continues to step 403, if not, it loops back to 401.

In step 403, upon finding a match, sponsored-story application 301 pulls the matching entry out of activity stream 302, and formats the entry into a predetermined visual specification. In particular embodiments, the visual specification is dictated by the social-networking system to mimic a regular news feed story. In other embodiments, special identifiers may be added by the social-networking system to indicate that the story is a sponsored story. In other embodiments, the visual specifications are entered by the sponsor through the Sponsor GUI 306 at the time of stream story specification. In such an embodiment, the visual specification is stored along with the story specification in the stream-sponsored-story-specification database 305. In particular embodiments, the sponsor is given limited discretion as to the visual specifications for the promoted stream story, subject to predetermined constraints imposed by the social-networking system.

In step 404, after the story is formatted pursuant to the visual specification or by the social-networking system to visually comport with a news feed story, the sponsored story is passed to sponsored-story system 304.

In step 405, after a social story is formatted into a sponsored story, it is priced and directed toward users in a similar manner as a social ad. In particular embodiments, the user may also add a weight to the story to alter its direction toward users. For example, certain stories may decay quickly, such as check-ins, and are not displayed to other users beyond a predetermined threshold time period from the story generation. In other embodiments, user-specified temporal factors, such as deadlines, may increase the weight of the sponsored story so that it is promoted over other sponsored stories lacking time sensitivity.

In particular embodiments, ad targeting is based upon an affinity score calculated by social-networking website 100. A member may have affinities for other members, types of actions, types of objects, and content. Accordingly, a calculated affinity score may be based on a weighted function that takes into account the set of affinities for the particular member for each type of data field that is in a candidate story. The website may obtain a member's affinities based on the member's express interests (whether provided directly or indirectly, for example, through communications with other members) or impliedly based on the member's actions (e.g., a member's checking of another member's page indicates an interest in that other member, or clicking on particular types of links may indicate an interest in similar links). An affinity, as measured for example by an affinity score, need not be an actual subjective interest or lack of interest that a member has for something (i.e., the member likes punk rock music, and dislikes vegetarian restaurants), but rather it may merely be a correlation between something in the candidate story and some information stored in connection with that member, whether is an action taken by the member, a communication involving the member, a characteristic, feature or expressed interest in the member's profile.

Figure 5:
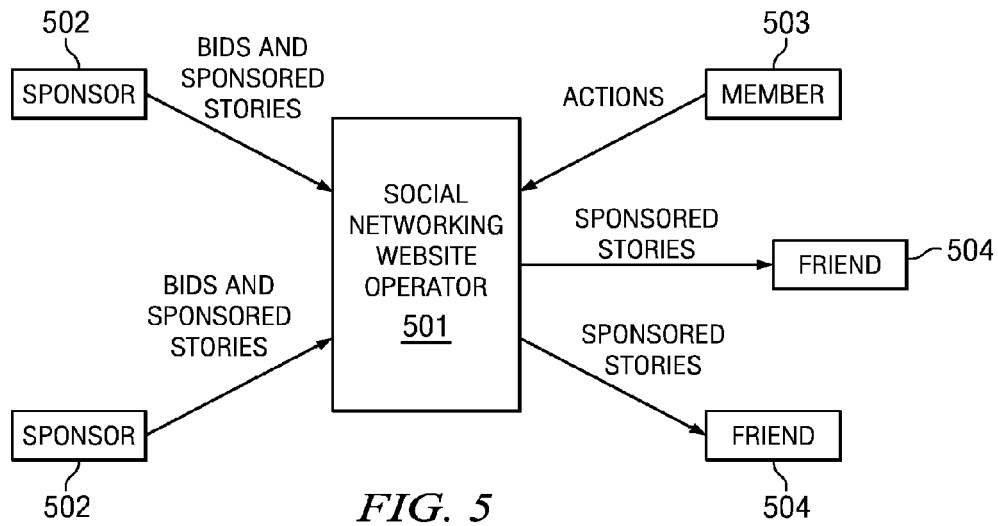
FIG. 5 illustrates example components of a sponsored-story system in a social-networking system.

FIG. 5 illustrates example components of a sponsored-story system in a social-networking system. In this sponsored-story model, a number of sponsors 502 bid for the placement of sponsored stories on a social-networking website 100. A social-networking website operator 501 receives these bids, for example, through a web interface accessible to sponsors 502. Accompanying each bid is a description of the sponsored story that sponsor 502 would like to publish to for display to a particular set of members of the social network. This disclosure contemplates a variety of methods of publishing the sponsored story. In particular embodiments, the sponsored story is published on a social network member's home page on the social network. In particular embodiments, the sponsored story may be displayed on a predetermined area of a mobile device. In particular embodiments, the sponsored story may be published through notifications in the social network. In particular embodiments, the sponsored story may be published through e-mail, instant messaging, or other messaging applications. In particular embodiments, the sponsored story may be displayed on a third-party website integrated with the social network. The web interface may thus allow sponsor 502 to specify all of the relevant information for a sponsored-story request, including the bid amount for the sponsored story.

The bid amount specified in the sponsored-story request may indicate an amount of money that sponsor 502 will pay for each time a member presented with the sponsored story clicks on it. In particular embodiments, the sponsor may be a non-profit or charity where the bid amount is given at little or no cost. Alternatively, the bid amount may specify an amount that sponsor 502 will pay the website operator 501 each time the sponsored story is displayed to a member or a certain number of members or each time the sponsored story is clicked on by a member or a certain number of members. In another embodiment, the sponsor may pay a set amount per month or period of time and the social-networking website will determine the bid amount or how and when to display the sponsored stories. In addition, the sponsored-story request may allow sponsor 502 to specify targeting criteria. This targeting criteria may be a filter to apply to fields of a member's member profile or other object, or it may include free form text such as wall posts, comments, and messages. In particular embodiments, to optimize the targeting and selection of sponsored stories for users of a social network, social information gathered on and off the social network about a user is leveraged to infer interests about users of the social network. A social network may maintain a social graph that identifies the mapping of connections among the users, including entities such as businesses, applications, groups, etc, of a social network, and the social network may also maintain profiles that contain full or partial information about each of the users in the social network. Targeting may be based one or more factors such as member demographics (age, gender, location, birth date, age, education level, employers, employment type, work history and experience, hobbies, and or preferences. These factors may draw from explicit member statements such as listing it on their profile, connections to other members or entities, or through user-entered text on and off the social networking site. In another embodiment, these factors may be implicitly or inferred by the social network.

One or more sponsored stories available to the social network may contain targeting criteria for determining whether the sponsored story should be targeted to a particular user. While the social network may have sufficient information about some of its users to apply the targeting criteria, the social network may not have sufficient information about other users to apply the targeting criteria. Rather than missing out on the opportunity to target sponsored stories to this latter group of users, embodiments use the information for other users to whom a particular user is connected when the social network does not have sufficient information to apply the targeting criteria to the user. This may be thought of as "inferential" targeting because a user's likely interest in a particular ad is inferred based on whether that user's connections (e.g., friends in the social network) are good candidates for the sponsored story based on its targeting criteria.

FIG. 6A depicts an example sponsor GUI 601. Sponsor GUI 601 includes a drop down window 610 that allows a user of sponsor GUI 601 to select any previously saved stream-sponsored-story specification 602a-602e. User controls 603, 604, and 605 give the user the option to save, deactivate/activate, or delete an existing stream-sponsored-story specification. User control 606 provides the user with the option to create a new stream-sponsored-story specification. The process of creating a new stream-sponsored-story specification is described in detail below.

Upon selecting user control 606, the user is presented with another set of drop down commands 607. Drop down menu 607 lists all the entities with which a user is associated in the social network. Examples of such an entity include but are not limited to, pages that the user has created to interact with fans of the page, such as for a musician or TV show, applications associated with the user, such as social-networking games, deals or coupons associated with the user, and physical locations associated with the user that members of the social network may "check in" to, to indicate that they or others were physically at the location.

After the user has selected the entity associated with the user to be included in the stream-sponsored-story specification, the user selects, using drop down menu 608, the types of interactions members of the social network have with the entity on and off the social network that the user would like to promote to the sponsored-story space. User interactions include, but are not limited to tagging, sharing, "liking", commenting on media or mentioning a user in a status update or comment, fringing someone, RSVPing or inviting a user to an event or game, and the like. Other user interactions include but are not limited to "check-ins" and other location-based social interactions, sharing a link from a third-party website, "liking" a post or page from a third-party site, buying, redeeming, or subscribing to deals and other promotions, and interacting with an application on or off the social network. Any time a user makes a connection or performs a social action on the social network, a new story is generated in activity stream 302 that may ultimately be promoted.

Depending on the type of entity selected in drop down menu 607, the interactions available in menu 608 available to the user vary. For example, if the user selects a page, such as for a band or musician, from menu 607, the interactions in 608 may include: when a member "likes" the page, when a member posts a link on page, when the page owner (generally, but not necessarily, the user of the sponsor GUI itself) posts a link on the page, or when a member shares a link to an external website that is related to the page. As another example, if the user of the sponsor GUI selects a place, such as a store location, from drop down menu 607, the GUI may show, in drop down menu 608: when a member of the social network "checks in" to the place, when a member of the social network gives a review of the place greater than a predetermined threshold, or when a member of the social network "likes" the place.

As described above, actions by users performed off of a social-networking website (e.g., actions on third party websites or in the real world) may be used to generate sponsored stories on the social-networking website. Conversely, in particular embodiments, a social-networking website can collect its users' actions and then present sponsored stories or other information concerning actions taken by its users on third party websites. In this way, the techniques for promoting actions using this information can be extended beyond a social-networking website itself.

Alternative embodiments are contemplated by the disclosure that may be contemplated by ones of ordinary skill in the art. In particular embodiments, the user may specify geographic or temporal criteria used by sponsored-story system 304 in determining which users to display the sponsored story to. For example, a user may desire to promote a promotion that expires in three days, and may specify to only promote stories for the next three days. In other embodiments, the user may specify to promote stories only for users located with a specific geographic location. In particular embodiments, user may specify a threshold of people taking the same action. For example, a user may want to display friend check-ins to members of the social network only if two or more friends of the user check-in to a given location substantially simultaneously. In such an embodiment, sponsored-story application 301 may search for multiple check-ins to a given location by friends of a specific users within a predetermined time period. If such stories are found, sponsored-story application 301 may aggregate the plurality of stories into a single sponsored story. After the user is satisfied with the specifications of the stream sponsored story that has just been created, the user may utilize controls 603 and 604 to save and activate the sponsored story, respectively.

FIG. 6B illustrates an example simplified sponsor GUI 306. The sponsor may use controls 610 and 620 to select where to display the sponsored story. For example, in 620, the user may select to display the sponsored story on targeted members' walls. Using controls 640, the sponsor may select what kind of story sponsored-story application 301 should search for in activity stream 302. In this example, the sponsor may select from a page post story, page "like" story, or a place check-in story. Finally, the sponsor GUI 306 may provide a preview 650 of the sponsored story.

Figure 7:
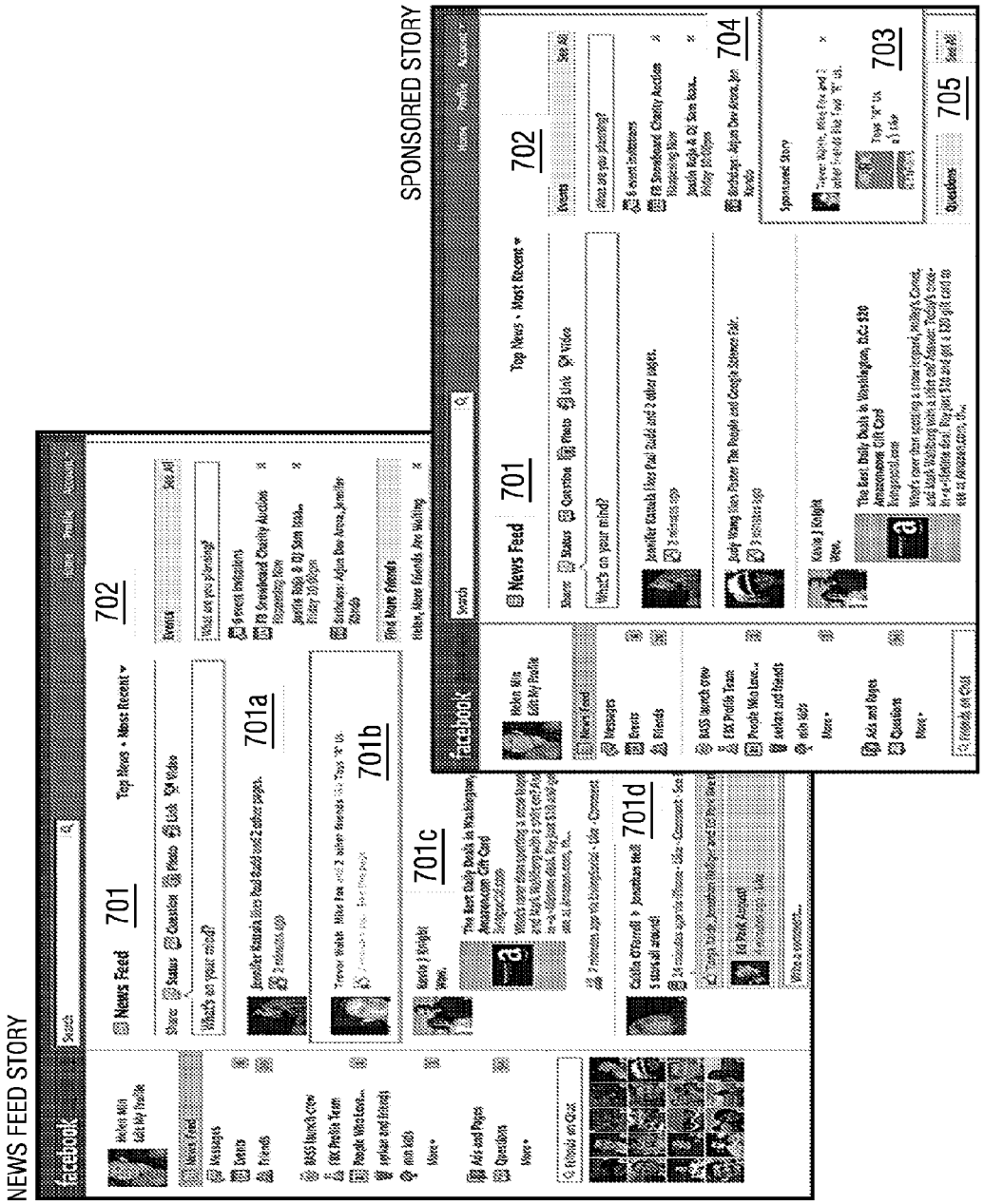
FIG. 7 illustrates an example news-feed story promoted to the sponsored-story space of a user's social-networking homepage in particular embodiments.
Figure 7A:
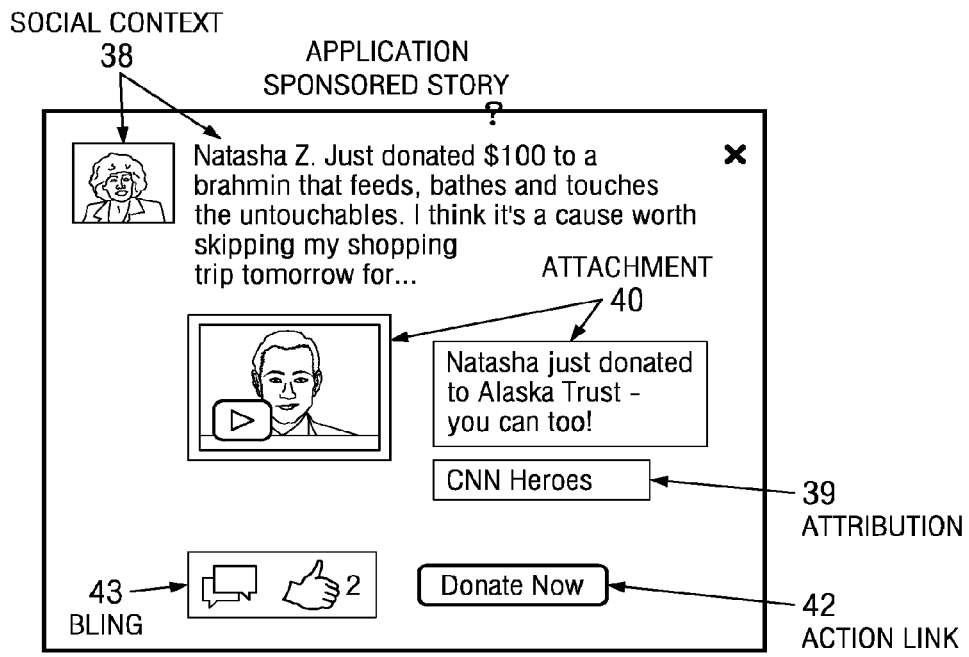
FIGS. 7A-E illustrate example sponsored stories.
Figure 7B:
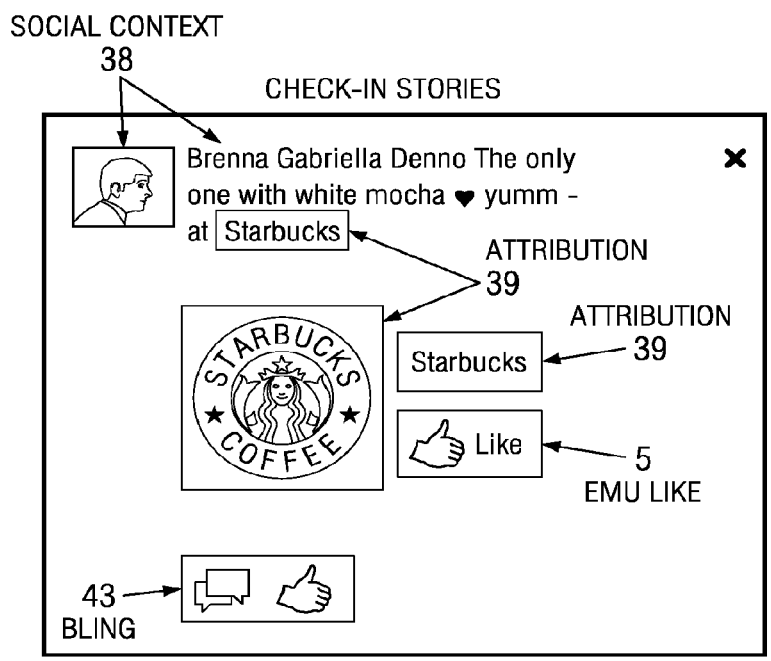

In FIG. 7, a user's news feed 701, recommendation space 702, sponsored-story space 703, notifications 704, and questions 705 are depicted. In particular embodiments, elements 701-705 are displayed on a social-networking user's home screen. In particular embodiments, element 701 is displayed on a user's home screen, and one or more of elements 702-705 are displayed at all times. This disclosure contemplates any arrangement of elements 701-705 and any degree of persistence. In particular embodiments, elements 702-705 are displayed on other user's pages. In particular embodiments, these other users may be the user's friend. In other embodiments, these other users may be otherwise associated with the user. In particular embodiments, the display of elements to other users 702-705 is determined by sponsored-story system 304. Sponsored-story system 304 accesses a database of user privacy preferences when determining which users to display the sponsored story to. For example, if a user has previously specified that he or she does not wish to see sponsored stories from a particular company, sponsored-story system 304 will not display stories promoted by that particular company. In particular embodiments, sponsored-story system 304 accesses the visibility and privacy settings of the user that generated the news feed story to be promoted, and uses the settings in determining which users to display the promoted story to. For example, a user may have multiple friend lists, and members belonging to one or more different lists may be prevented from viewing specific stories, types of stories, or the user's news feed altogether. sponsored-story system 304 respects these settings so that only friends of the user who are granted access to view the news feed story to be promoted are displayed the promoted stream sponsored story. This disclosure contemplates various methods of determining which users to display element 703 to as envisioned by those of ordinary skill in the art. News feed 701 includes news feed stories 701a-701d. These stories are generated specifically for a user based upon the activities the user's friends or other entities the user is associated with. News feed story 701b is an example of a news feed story that has been selected for promoting to sponsor space 703. When sponsored-story application 301 detects a match in activity stream 302 to a sponsor's stream-sponsored-story specification from stream-sponsored-story-specification database 303, sponsored story 703 is formatted to resemble a news feed story and sent to sponsored-story system 304. In this particular example, the stream story relates to a story when four friends of a user "liked" the entity "Toys 'R' Us." Formatted sponsored story 703 is promoted to the user or another set of users by sponsored-story system 304.

Figure 7C:
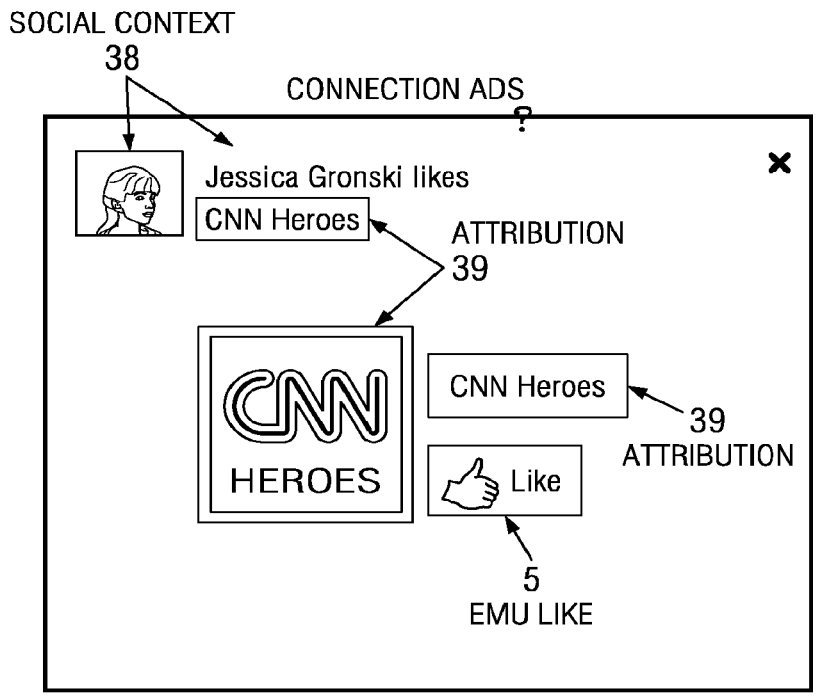
Figure 7D:
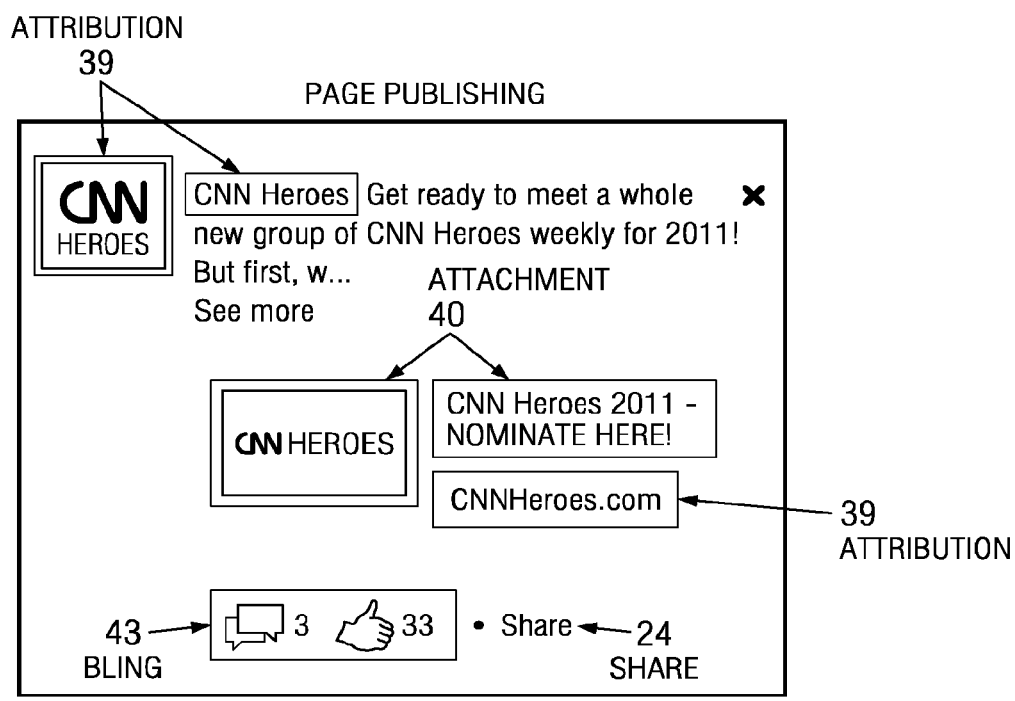
Figure 7E:
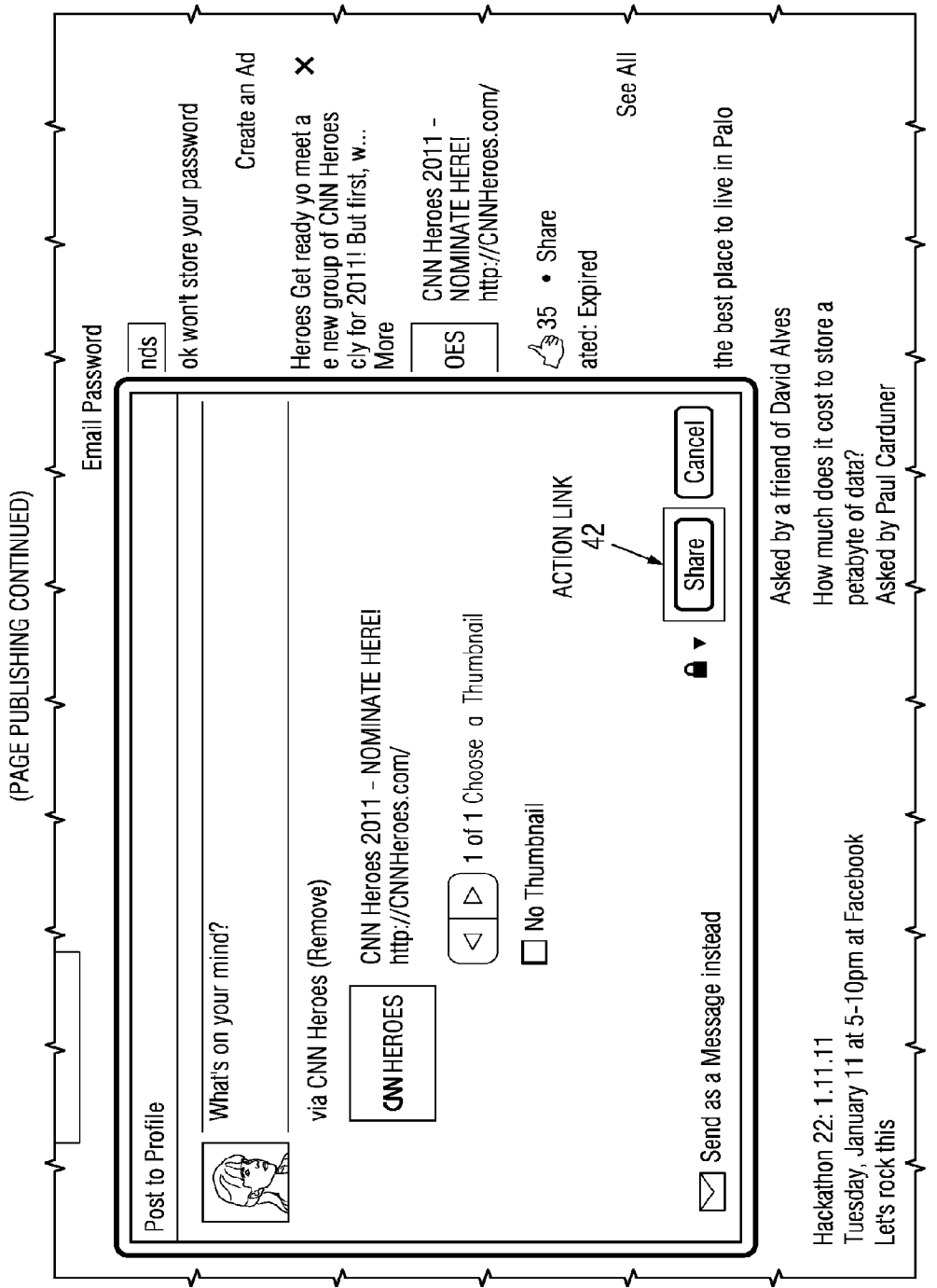

FIGS. 7A-E illustrate example sponsored stories 703. Each sponsored story 703 includes a social context 38. In particular embodiments, social context 38 comprises the user who performed the social action, a descriptor of the action, and a comment entered by the user who performed the social action. Sponsored stories 703 may also include an attribution 39, corresponding to the entity selected by the sponsor in sponsor GUI 306. In particular embodiments, the attribution is the node with which the user interacted or connected with to generate the stream story. For example, in FIG. 7B, the user interacted with the entity "Starbucks" by checking-in to a Starbucks location. In FIG. 7C, user interacted with the entity or node "CNN Heroes" by "liking" the entity. Sponsored stories 703 may also include a bling indicator 43, which provides a visual indication as to how many members of the social-networking site have commented or liked the sponsored story. Emu like interface 6 allows users to quickly interact with the node/entity by "liking" it. In particular embodiments, sponsored story 703 may include an action link 42, which allows a user, when selecting the link, to quickly perform a predetermined action, such as, in FIG. 7A, donating to a particular cause. FIG. 7D depicts an example where an share link 24 to share a story published by an entity or node, in this case "CNN Heroes," is provided. Upon clicking share link 24, the user is taken to an interface depicted in FIG. 7E, which allows the user to publish the sponsored story back to his or her own news feed. Action link 42 in FIG. 7E posts the sponsored story to the user's own wall along with any comments the user optionally chooses to append to the story. The embodiments depicted in FIGS. 7A-7E are merely examples and are in no way limiting; this disclosure contemplates any number of formatting and actions for sponsored stories.

Figure 8:
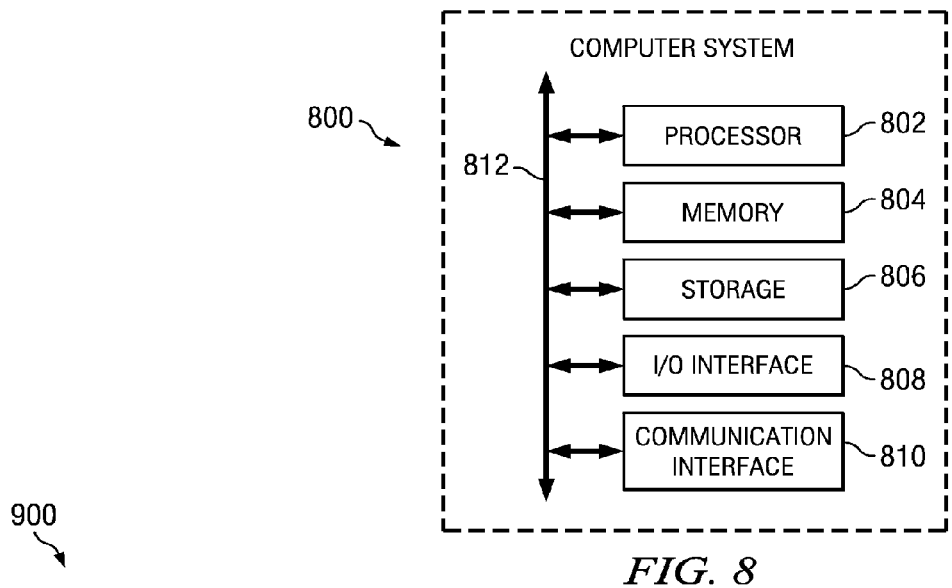
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 02 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
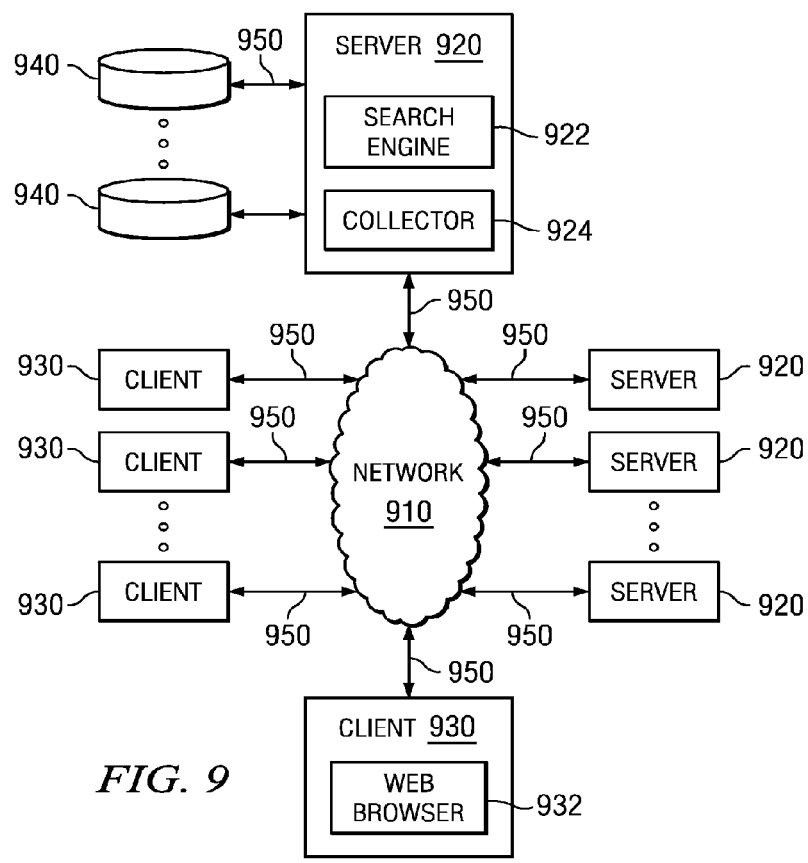
FIG. 9 illustrates an example network environment.

FIG. 9 illustrates an example network environment 900. This disclosure contemplates any suitable network environment 900. As an example and not by way of limitation, although this disclosure describes and illustrates a network environment 900 that implements a client-server model, this disclosure contemplates one or more portions of a network environment 900 being peer-to-peer, where appropriate. Particular embodiments may operate in whole or in part in one or more network environments 900. In particular embodiments, one or more elements of network environment 900 provide functionality described or illustrated herein. Particular embodiments include one or more portions of network environment 900. Network environment 900 includes a network 910 coupling one or more servers 920 and one or more clients 930 to each other. This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 couple servers 920 and clients 930 to network 910 or to each other. This disclosure contemplates any suitable links 950. As an example and not by way of limitation, one or more links 950 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 950. In particular embodiments, one or more links 950 each includes an intranet, an extranet, a VPN, a LAN, a WLAN, a WAN, a MAN, a communications network, a satellite network, a portion of the Internet, or another link 950 or a combination of two or more such links 950. Links 950 need not necessarily be the same throughout network environment 900. One or more first links 950 may differ in one or more respects from one or more second links 950.

This disclosure contemplates any suitable servers 920. As an example and not by way of limitation, one or more servers 920 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 920 includes hardware, software, or both for providing the functionality of server 920. As an example and not by way of limitation, a server 920 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 930, the web server may communicate one or more such files to client 930. As another example, a server 920 that operates as a mail server may be capable of providing e-mail services to one or more clients 930. As another example, a server 920 that operates as a database server may be capable of providing an interface for interacting with one or more data stores (such as, for example, data stores 940 described below). Where appropriate, a server 920 may include one or more servers 920; be unitary or distributed; span multiple locations; span multiple machines; span multiple datacenters; or reside in a cloud, which may include one or more cloud components in one or more networks.

In particular embodiments, one or more links 950 may couple a server 920 to one or more data stores 940. A data store 940 may store any suitable information, and the contents of a data store 940 may be organized in any suitable manner. As an example and not by way or limitation, the contents of a data store 940 may be stored as a dimensional, flat, hierarchical, network, object-oriented, relational, XML, or other suitable database or a combination or two or more of these. A data store 940 (or a server 920 coupled to it) may include a database-management system or other hardware or software for managing the contents of data store 940. The database-management system may perform read and write operations, delete or erase data, perform data deduplication, query or search the contents of data store 940, or provide other access to data store 940.

In particular embodiments, one or more servers 920 may each include one or more search engines 922. A search engine 922 may include hardware, software, or both for providing the functionality of search engine 922. As an example and not by way of limitation, a search engine 922 may implement one or more search algorithms to identify network resources in response to search queries received at search engine 922, one or more ranking algorithms to rank identified network resources, or one or more summarization algorithms to summarize identified network resources. In particular embodiments, a ranking algorithm implemented by a search engine 922 may use a machine-learned ranking formula, which the ranking algorithm may obtain automatically from a set of training data constructed from pairs of search queries and selected Uniform Resource Locators (URLs), where appropriate.

In particular embodiments, one or more servers 920 may each include one or more data monitors/collectors 924. A data monitor/collection 924 may include hardware, software, or both for providing the functionality of data collector/collector 924. As an example and not by way of limitation, a data monitor/collector 924 at a server 920 may monitor and collect network-traffic data at server 920 and store the network-traffic data in one or more data stores 940. In particular embodiments, server 920 or another device may extract pairs of search queries and selected URLs from the network-traffic data, where appropriate.

This disclosure contemplates any suitable clients 930. A client 930 may enable a user at client 930 to access or otherwise communicate with network 910, servers 920, or other clients 930. As an example and not by way of limitation, a client 930 may have a web browser 932, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 930 may be an electronic device including hardware, software, or both for providing the functionality of client 930. As an example and not by way of limitation, a client 930 may, where appropriate, be an embedded computer system, a system on a chip (SOC), a single-board computer (SBC) (such as a computer-on-module (COM) or system-on-module (SOM)), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 930 may include one or more clients 930; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, although particular embodiments herein have been described or illustrated in the context of a social-networking system, particular embodiments may be used with any suitable social-networking system, even if not provided through a website. Particular embodiment may be used in any suitable computer-based system that provides social-networking functionality, even if it relies for example on e-mail, instant messaging, or other form of peer-to-peer communications or another suitable technique for electronic communication between users. This disclosure is not limited to any particular type of communication system, network, protocol, format, or application.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Particular embodiments are disclosed herein in terms of algorithms or symbolic representations of operations on information. A person having ordinary skill in the art may use algorithms or symbolic representations to convey the substance of his or her work effectively to other persons having ordinary skill in the art. Such algorithms or symbolic representations, while described functionally, computationally, or logically, are understood to be implemented by computer programs or equivalent electrical circuits, microcode, or the like. This disclosure may refer to such algorithms or symbolic representations as modules, without loss of generality. such algorithms or symbolic representations and their modules may be embodied in software, firmware, hardware, or any suitable combination of these.

In particular embodiments, one or more suitable hardware or software modules, alone or in combination with other devices, may perform or implement one or more of the steps, operations, or processes disclosed herein. Particular embodiments implement a software module with a computer-program product comprising a computer-readable non-transitory storage medium or media that contains computer-program code for execution by a computer processor to perform one or more of the steps, operations, or processes disclosed herein.

Particular embodiments encompass an apparatus for performing one or more of the steps, operations, or processes disclosed herein. Such apparatus may be specially constructed for those steps, operations, or processes. In addition or as an alternative, such apparatus may comprise a general-purpose computing device selectively activated or reconfigured by a computer program running on it. The computer program may be stored in one or more computer-readable non-transitory storage media coupled to a computer system bus. Herein, where appropriate, reference to a computing device or system may encompass an architecture with a single processor or, for increased computing capability, an architecture with multiple processors.

Particular embodiments may implement one or more of the steps, operations, or processes disclosed herein using any of a wide variety of physical systems in any of a wide variety of network or computing environments. The computer systems disclosed herein are examples provided for didactic, rather than limiting, purposes.

What is claimed is:

1. A method comprising, by one or more computing systems:
    receiving sponsor specifications designating story characteristics, wherein the story characteristics comprises an entity identifier (ID);
    monitoring an organic activity stream for entries matching the story characteristics;
    identifying an entry as matching the story characteristics at least in part because the entry is associated with a user of a social-networking system interacting through the social-networking system with an entity corresponding to the entity ID;
    calculating a score for each of one or more viewing users of the social-networking system, the score representing the viewing user's affinity for the entity based at least in part on the viewing user's profile on the social-networking system;
    in response to identifying an entry as matching the story characteristics, providing for display the entry in a predetermined area of a web page, the entry provided for display to one or more of the viewing users selected at least in part based on the calculated scores.

2. The method of claim 1, wherein:
    the story characteristics comprise a particular application identifier (ID); and
    the entry is identified as matching the story characteristics at least in part because it was published through an application with the particular application ID.

3. The method of claim 2:
    wherein the entry identified as matching the story characteristics is associated with a first user of a social-networking system; and
    the method further comprises providing for display the entry identified as matching the story characteristics to one or more second users of the social-networking system connected to the first within the social-networking system.

4. The method of claim 3, wherein the entry identified as matching the story characteristics is provided for display in one or more news feeds received by the second users.

5. The method of claim 1, wherein the method further comprises providing for display the entry identified as matching the story characteristics to one or more other users of the social-networking system connected to the first user within the social-networking system.

6. The method of claim 1, wherein the method further comprises providing for display the entry identified as matching the story characteristics to one or more other users of the social-networking system connected to the entity within the social-networking system.

7. The method of claim 1, wherein the entry identified as matching the story characteristics is provided for display in one or more news feeds received by one or more users of the social-networking system connected to the entity within the social-networking system.

8. The method of claim 1, wherein the entry identified as matching the story characteristics is provided for display in one or more news feeds received by one or more other users of the social-networking system that have interacted through the social-networking system with the entity.

9. The method of claim 1, wherein the entry identified as matching the story characteristics is provided for display to each of the one or more users that has a score that exceeds a predetermined threshold value and is connected through the social-networking system to the user associated with the entry.

10. The method of claim 1, wherein the entry identified as matching the story characteristics is provided for display in a news feed comprising entries in organic activity streams associated with users of the social-network system connected to the entity within the social-networking system.

11. The method of claim 1, interacting through the social-networking system with the entity comprises:
    liking the entity on the social-networking system;
    posting a link on the social-networking system to a web page associated with the entity;
    checking in on the social-networking system at a location associated with the entity; or
    posting a review of the entity that rates above a predetermined threshold value.

12. The method of claim 1, wherein the entry identified as matching the story characteristics is provided for display with an indication of its social context, its social context comprising:
    an identification of a user associated with the organic activity stream;
    a description of an action by the user that caused the entry to be generated;
    a comment entered by the user in connection with the entry; or
    an attribution to an entity that the user interacted with in connection with the entry.

13. The method of claim 1, wherein the entry identified as matching the story characteristics is provided for display through a notification or on a third-party website.

14. One or more computer-readable non-transitory storage media embodying software that is operable when executed by one or more computing devices to:
    receive sponsor specifications designating story characteristics, wherein the story characteristics comprises an entity identifier (ID);
    monitor an organic activity stream for entries matching the story characteristics;
    identify an entry as matching the story characteristics at least in part because the entry is associated with a user of a social-networking system interacting through the social-networking system with an entity corresponding to the entity ID;

calculate a score for each of one or more viewing users of the social-networking system, the score representing the viewing user's affinity for the entity based at least in part on the viewing user's profile on the social-networking system;

in response to identifying an entry as matching the story characteristics, provide for display the entry in a predetermined area of a web page, the entry provided for display to one or more of the viewing users selected at least in part based on the calculated scores.

15. The media of claim 14, wherein:

the story characteristics comprise a particular application identifier (ID); and the entry is identified as matching the story characteristics at least in part because it was published through an application with the particular application ID.

16. The media of claim 15:

wherein the entry identified as matching the story characteristics is associated with a first user of a social-networking system; and the software is further operable when executed by one or more computing devices to provide for display the entry identified as matching the story characteristics to one or more second users of the social-networking system connected to the first within the social-networking system.

17. The media of claim 16, wherein the entry identified as matching the story characteristics is provided for display in one or more news feeds received by the second users.

18. The media of claim 14, wherein the software is further operable when executed by one or more computing devices to provide for display the entry identified as matching the story characteristics to one or more other users of the social-networking system connected to the first user within the social-networking system.

19. The media of claim 14, wherein the software is further operable when executed by one or more computing devices to provide for display the entry identified as matching the story characteristics to one or more other users of the social-networking system connected to the entity within the social-networking system.

20. The media of claim 14, wherein the entry identified as matching the story characteristics is provided for display in one or more news feeds received by one or more users of the social-networking system connected to the entity within the social-networking system.

21. The media of claim 14, wherein the entry identified as matching the story characteristics is provided for display in one or more news feeds received by one or more other users of the social-networking system that have interacted through the social-networking system with the entity.

22. The media of claim 14, wherein the entry identified as matching the story characteristics is provided for display to each of the one or more users that has a score that exceeds a predetermined threshold value and is connected through the social-networking system to the user associated with the entry.

23. The media of claim 14, wherein the entry identified as matching the story characteristics is provided for display in a news feed comprising entries in organic activity streams associated with users of the social-network system connected to the entity within the social-networking system.

24. The media of claim 14, wherein interacting through the social-networking system with the entity comprises:

liking the entity on the social-networking system;

posting a link on the social-networking system to a web page associated with the entity;

checking in on the social-networking system at a location associated with the entity; or posting a review of the entity that rates above a predetermined threshold value.

25. The media of claim 14, wherein the entry identified as matching the story characteristics is provided for display with an indication of its social context, its social context comprising:

an identification of a user associated with the organic activity stream;

a description of an action by the user that caused the entry to be generated;

a comment entered by the user in connection with the entry; or an attribution to an entity that the user interacted with in connection with the entry.

26. The media of claim 14, wherein the entry identified as matching the story characteristics is provided for display through a notification or on a third-party website.

* * * * *